(12) United States Patent
Tanaka et al.

(10) Patent No.: US 7,353,150 B2
(45) Date of Patent: Apr. 1, 2008

(54) TIRE PROFILE DESIGN METHOD

(75) Inventors: Masatoshi Tanaka, Kobe (JP); Takuya Yamamoto, Kobe (JP)

(73) Assignee: Sumitomo Rubber Industries, Ltd., Kobe-Shi, Hyogo (JP)

( * ) Notice: Subject to any disclaimer, the term of this patent is extended or adjusted under 35 U.S.C. 154(b) by 526 days.

(21) Appl. No.: 10/870,955

(22) Filed: Jun. 21, 2004

(65) Prior Publication Data
US 2005/0033462 A1   Feb. 10, 2005

(30) Foreign Application Priority Data
Aug. 5, 2003   (JP) .............................. 2003-205923

(51) Int. Cl.
*G06F 7/60* (2006.01)
*G06G 7/48* (2006.01)

(52) U.S. Cl. .............................................. 703/7; 703/2
(58) Field of Classification Search .................... 703/1, 703/2, 7
See application file for complete search history.

(56) References Cited

U.S. PATENT DOCUMENTS 6,073,668 A * 6/2000 Iwasaki et al. ........ 152/209.14

FOREIGN PATENT DOCUMENTS

JP   2002-301916 A   10/2002

* cited by examiner

*Primary Examiner*—Hugh Jones
(74) *Attorney, Agent, or Firm*—Birch, Stewart, Kolasch & Birch, LLP

(57) ABSTRACT

First of all, size data (MD), (BD), (BH) and (MW) of a tire are input. Next, a ratio (b/a) of a major axis radius (b) to a minor axis radius (a) of an ellipse (18) is input. Then, constants (S), (a) and (b) of an involute function are calculated. Based on the involute function having these constants, a profile function (22) from a central position in a lateral direction to a maximum width position is determined over an X-Y plane. Subsequently, the profile curve (22) is divided into a large number of segments. Next, each of the segments is caused to approximate to a circular arc. In the approximation, a radius of curvature is determined in such a manner that the adjacent circular arcs are tangent to each other. Thus, a profile is designed.

5 Claims, 7 Drawing Sheets

TIRE PROFILE DESIGN METHOD

This application claims priority on Patent Application No. 2003-205923 filed in JAPAN on Aug. 5, 2003.

BACKGROUND OF THE INVENTION

1. Field of the Invention

The present invention relates to a method, system and computer program for designing a tire profile.

2. Description of the Related Art

The profile of a tire (the contour of the surface of the tire which is obtained on assumption that a groove is not formed on a tread) influences the basic performance of the tire, for example, a handling stability, a ride comfort or the like. Depending on the uses or size of the tire or the like, it is necessary to design a proper profile. Japanese Laid-Open Patent Publication No. 2002-301916 has disclosed a method for designing the contour of a tread which uses an involute function. This design method uses an involute curve passing through a center in a transverse direction (an equator point) and a tread end.

In the method disclosed in the Japanese Laid-Open Patent Publication No. 2002-301916, the contour of the tread is only determined. A tire comprises a tread and a sidewall which is continuously linked to the tread. The contour of the tread and that of the sidewall are to be linked smoothly and continuously. In the method disclosed in the publication described above, trial and error are repeated until the contour of the tread which is smoothly linked to the contour of the sidewall is obtained. This design method is not efficient.

It is an object of the present invention to provide a method for easily obtaining a profile from a tread to a sidewall.

SUMMARY OF THE INVENTION

A method for designing a profile according to the present invention comprises the steps of:

inputting tire size data;

determining a type of a function;

determining a constant of the function based on the tire size data in such a manner that a function curve passing through a maximum width position of a tire and a central position in a lateral direction can be drawn; and determining a profile curve reaching the maximum width position from the central position in the lateral direction based on the function having the constant. In this designing method, the profile curve reaching the maximum width position from the central position in the lateral direction is obtained. Therefore, it is possible to easily design a profile from a tread to a sidewall based on the profile curve.

A preferred function is an involute function. The involute function is based on an ellipse in which one of the ends of a first axis is placed on a tire equator plane and a first axis direction is coincident with the axial direction of the tire. In the determination of the function, a ratio (b/a) of a second axis radius "b" of the ellipse to a first axis radius "a" of the ellipse is determined. In this method, the profile curve corresponding to the ratio (b/a) is obtained. Consequently, various profiles can easily be designed. In this specification, the first axis implies one of a minor axis and a major axis and the second axis implies the other.

The involute function to be used in the step of determining the profile curve is expressed in the following equations (I) and (II).

$$x(\theta) = a(1+\cos\theta) + b\sin\theta\sqrt{1/(a^2\cos^2\theta + b^2\sin^2\theta)}\left[S - \int_{\pi}^{\pi-\theta}(a^2\cos^2\theta + b^2\sin^2\theta)d\theta\right] \quad (I)$$

$$y(\theta) = b\sin\theta + a\cos\theta\sqrt{1/(a^2\cos^2\theta + b^2\sin^2\theta)}\left[S - \int_{\pi}^{\pi-\theta}(a^2\cos^2\theta + b^2\sin^2\theta)d\theta\right] \quad (II)$$

In the Equations (I) and (II), "a" represents the first axis radius of the ellipse, "b" represents the second axis radius of the ellipse and "S" represents a length of a thread wound upon the ellipse. θ is π/2 to π.

It is preferable that the profile design method should further comprise the steps of:

dividing the profile curve into a plurality of segments; and causing the segments to approximate to circular arcs in such a manner that the adjacent circular arcs are tangent to each other. The mold of a tire comprising a profile obtained by this method can be acquired by a simple processing.

It is preferable that the profile design method should further comprise the step of moving a boundary point between a first circular arc from the maximum width position and a second circular arc along a circumference defining the second circular arc and correcting a radius of curvature of the first circular arc in such a manner that the first circular arc is tangent to a contour line which is on an inside in a radial direction of a tire from the maximum width position at the maximum width position. By this method, it is possible to obtain a tire in which a whole contour is provided smoothly and continuously.

A tire profile design system according to the present invention comprises:

input means for inputting a ratio (b/a) of a second axis radius "b" to a first axis radius "a" in an ellipse in which one of ends of a first axis is placed on a tire equator plane and a direction of the first axis is coincident with an axial direction of a tire and tire size data; and calculating means for determining a constant of an involute function based on the tire size data in such a manner that an involute curve based on the ellipse having the ratio (b/a) passes through a maximum width position of the tire and a central position in a lateral direction and determining a profile curve reaching the maximum width position from the central position in the lateral direction based on the involute function having the constant. By this system, it is possible to easily design a profile from a tread to a sidewall.

A computer program for designing a tire profile according to the present invention is constituted to cause a computer to execute the steps of:

inputting tire size data;

determining a ratio (b/a) of a second axis radius "b" to a first axis radius "a" in an ellipse in which one of ends of a first axis is placed on a tire equator plane and a direction of the first axis is coincident with an axial direction of a tire;

determining a constant of an involute function based on the tire size data in such a manner that an involute curve based on the ellipse having the ratio (b/a) passes through a maximum width position of the tire and a central position in a lateral direction; and determining a profile curve reaching the maximum width position from the central position in the lateral direction based on the involute function having the constant. By this computer program, it is possible to easily design a profile from a tread to a sidewall.

DESCRIPTION OF THE PREFERRED EMBODIMENTS

The present invention will be described below in detail based on a preferred embodiment with reference to the drawings.

Figure 1:
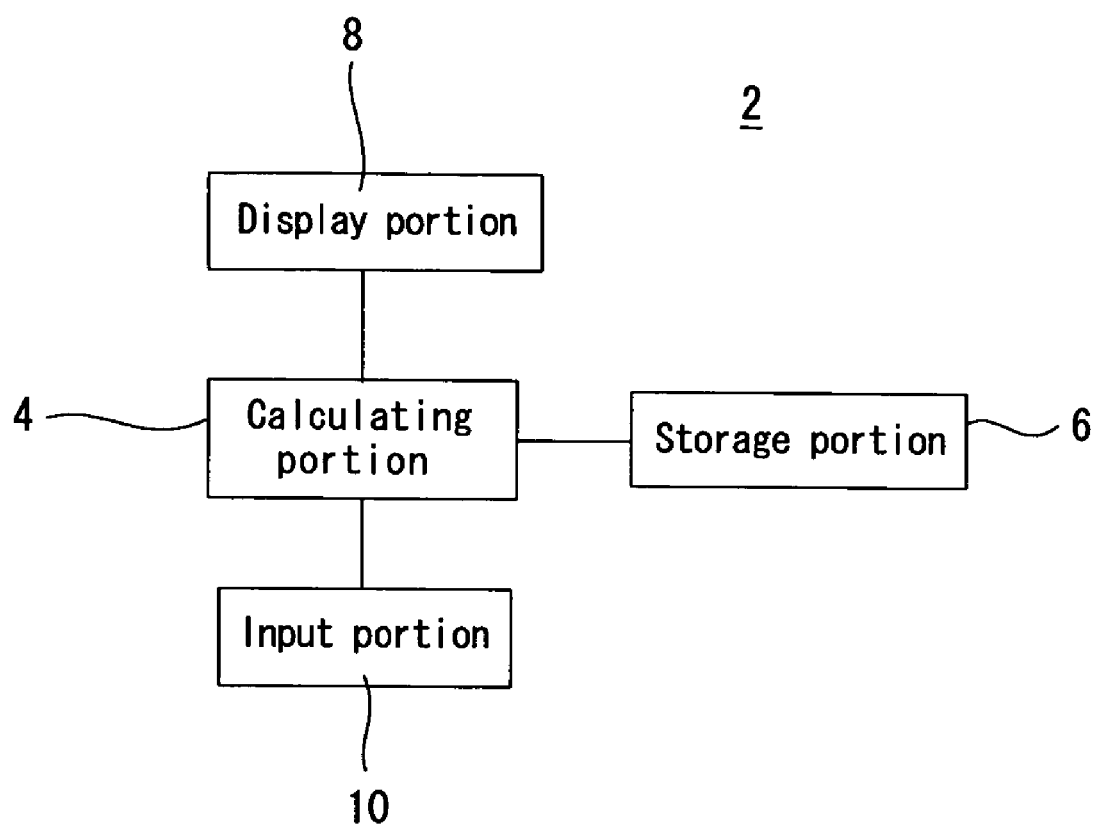
FIG. 1 is a conceptual diagram showing a system to be used in a tire profile design method according to an embodiment of the present invention.

A system 2 shown in FIG. 1 comprises a calculating portion 4, a storage portion 6, a display portion 8 and an input portion 10. The typical calculating portion 4 includes a CPU. The typical storage portion 6 is a hard disk. The typical display portion 8 is a monitor. The typical input portion 10 is a keyboard and a mouse. In the system 2, each step is executed in accordance with a computer program stored in the storage portion 6.

Figure 2:
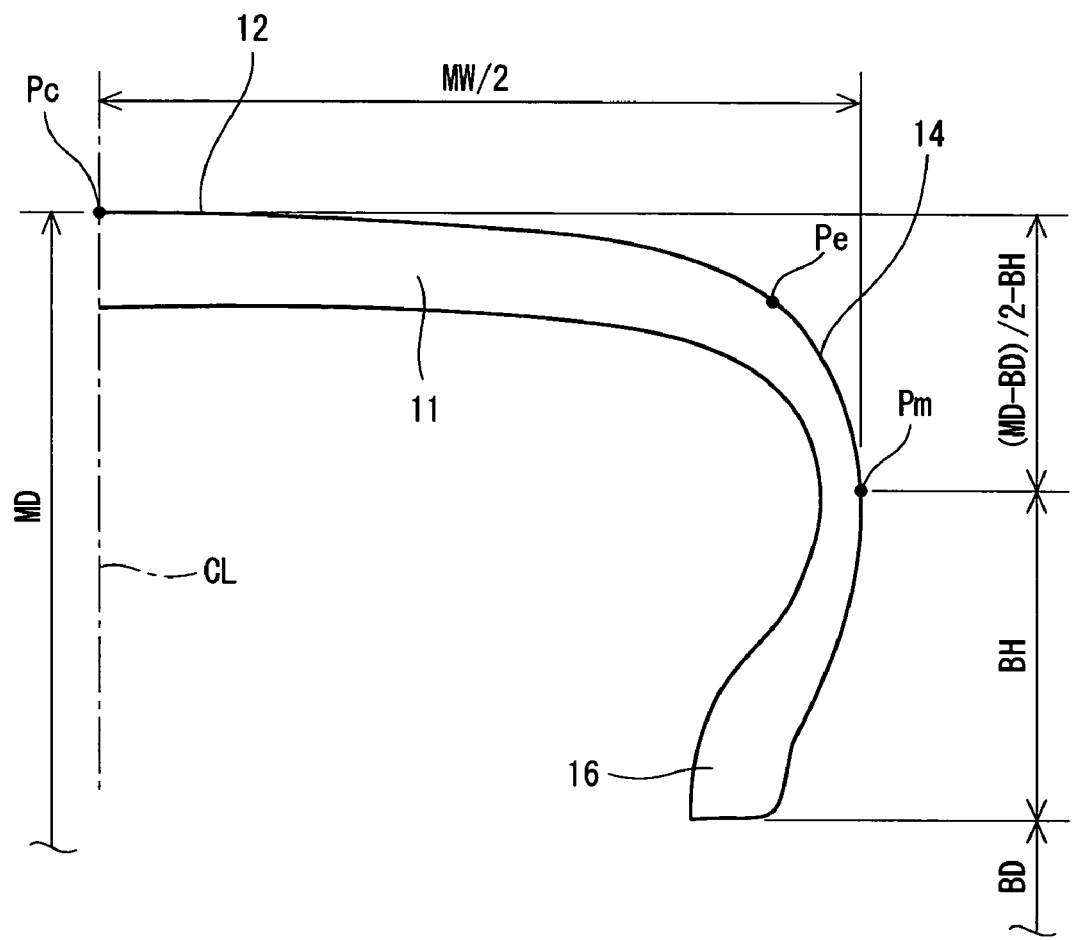
FIG. 2 is a sectional view showing a part of a tire having a profile designed by the system of FIG. 1.

FIG. 2 is a sectional view showing a part of a tire 11 having a profile designed by the system 2 of FIG. 1. FIG. 2 shows a section taken along a plane including the axis of the tire 11. The tire 11 includes a tread 12, a sidewall 14 and a bead 16. In FIG. 2, a transverse direction is set to be a lateral direction (an axial direction) and a vertical direction is set to be a radial direction. In FIG. 2, Pc denotes a central position in the lateral direction of the tread 12 (an equator point), Pe denotes a tread end, and Pm denotes a maximum width position. The tread 12 and the sidewall 14 are adjacent to each other with the tread end Pe set to be a boundary. A distance in a horizontal direction between the points Pc and Pm is a half of a maximum width MW. A distance in a vertical direction between the points Pc and Pm is ((MD−BD/2−BH). MD represents a diameter of the tire 11, BD represents a bead inside diameter (a diameter of a circle formed by the lower end of the bead 16), and BH represents a distance in a vertical direction between the lower end of the bead 16 and the maximum width position Pm.

Figure 3:
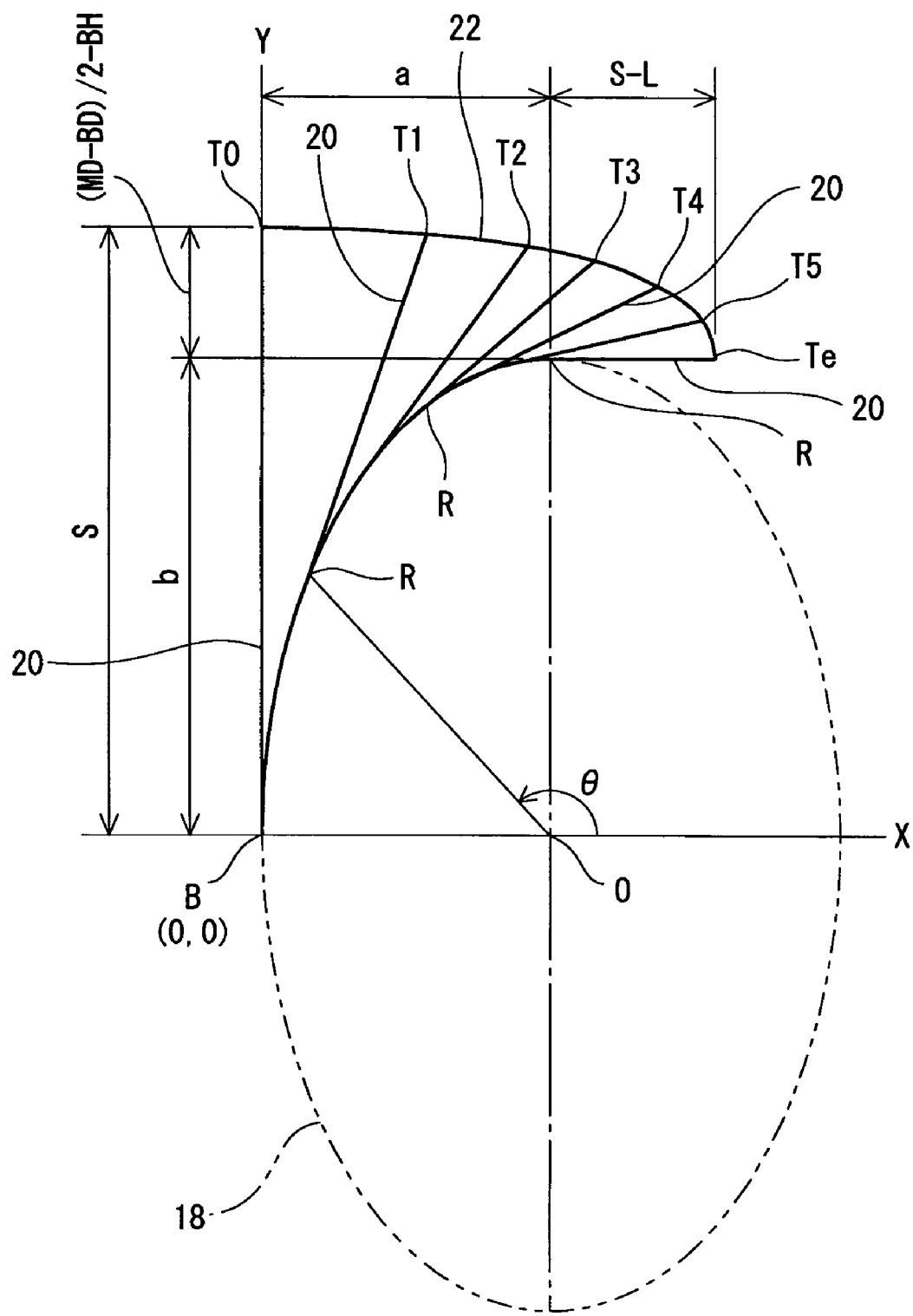
FIG. 3 is a typical view showing a process for drawing a profile curve for the tire in FIG. 2 over an X-Y plane.

FIG. 3 is a typical view showing a process for drawing a profile curve for the tire 11 of FIG. 2 over an X-Y plane. FIG. 3 shows an ellipse 18. A radius of the minor axis of the ellipse 18 is indicated as "a", a radius of a major axis is indicated as "b", and a circumferential length is indicated as (4·L). The direction of the minor axis is coincident with an X direction (the axial direction of the tire 11) and the direction of the major axis is coincident with a Y-axis direction (the radial direction of the tire 11). FIG. 3 also shows a thread 20. The thread 20 is placed on a Y-axis at the beginning and a lower end B is fixed to one of the ends of the minor axis. The lower end B of the thread 20 has coordinates (0, 0). An upper end T0 of the thread 20 is pulled upward so that a constant tension is applied to the thread 20. The length of the thread 20 is shown in an arrow S of the drawing. When a force in a rightward direction is applied to the upper end T0 of the thread 20, the upper end T0 is gradually moved to T1, T2, T3, T4, T5 and Te. In the meantime, an angle θ formed with an X axis by a straight line connecting a point of contact R of the thread 20 and the ellipse 18 and a center O is decreased gradually. A locus formed by the movement of the upper end is referred to as an involute curve. Coordinates (x, y) of a point on the involute curve can be calculated by the Equations (I) and (II). The involute curve in a change in θ from π to (π/2) is the profile curve. The profile curve depends on the size and shape of the ellipse 18. In other words, the profile curve depends on the minor axis radius "a", the major axis radius "b" and a ratio (b/a).

Figure 4:
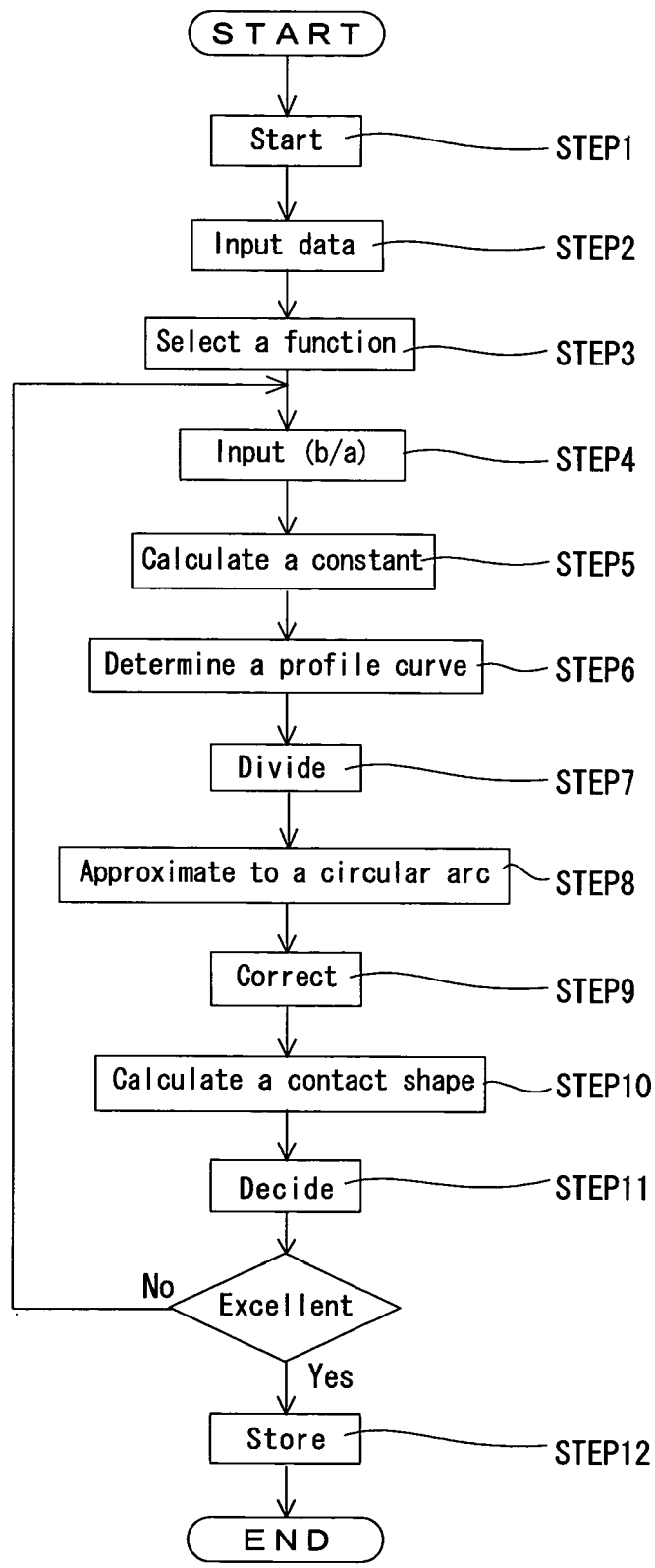
FIG. 4 is a flow chart showing an example of the profile design method using the system of FIG. 1.

FIG. 4 is a flow chart showing an example of a profile design method using the system 2 of FIG. 1. In this method, first of all, a program is started in the system 2 (STEP 1). By the starting, an input menu is displayed on the display portion 8 and a data input is promoted. By using the input portion 10 (the keyboard), a designer inputs data on the size of the tire 11 of which profile is to be designed (STEP 2). The data include a numeric value required for calculating the coordinates of the maximum width position Pm of the tire 11 and the central position Pc in the lateral direction of a tread surface. Examples of the data on the size include the diameter MD of the tire 11, the bead inside diameter BD, the distance BH between the lower end of the bead 16 and the maximum width position Pm, the maximum width MW and the like. These data may be calculated from other data (for example, an aspect ratio).

Next, the types of a plurality of functions are displayed on the display portion 8 and a selection is promoted. The designer selects the function to be used for determining a curve by means of the input portion 10 (the mouse) (STEP 3). Specific examples of the curve include an involute curve, a parabola, a cycloid curve, a sine curve, a hyperbola and an elliptic curve. In the following description, the case in which an involute function is selected will be taken as an example.

Subsequently, the input menu is displayed on the display portion 8 and the input of (b/a) is promoted. The designer predicts the value of (b/a) of which intended profile can be obtained, and this value is input by the input portion 10 (STEP 4). Steps from the selection of the function (STEP 3) to the input of (b/a) (STEP 4) will be referred to as "a decision of the type of the function" in this specification.

As is apparent from FIG. 3, a relationship expressed in the following equations (III) and (IV) is established among the length "S" of the thread 20, the minor axis radius "a" and the major axis radius "b".

$$S = b + (MD - BD)/2 - BH$$

$$MW/2 = (a + (S - L))$$

The values of the diameter MD of the tire 11, the bead inside diameter BD, the distance BH between the lower end of the bead 16 and the maximum width position Pm, and the maximum width MW have already been input, and furthermore, the value of (b/a) has also been input. By the equations (III) and (IV), consequently, the constant values S, a and b of the involute function are calculated (STEP 5). The calculation is carried out by the calculating portion 4.

Based on the involute function having these constants, a profile curve 22 from the central position Pc in the lateral direction to the maximum width position Pm is determined over the X-Y plane (STEP 6). The determination is also carried out by the calculating portion 4. The profile curve 22 thus obtained is terminated at the maximum width position Pm. In other words, in the design method, it is not necessary to repeat trial and error in order to terminate the profile curve 22 at the maximum width position Pm. The profile curve 22 thus obtained passes through the tread end Pe. The tread 12 and the sidewall 14 are provided smoothly and continuously at the tread end Pe on the profile curve 22. In other words, in the design method, it is not necessary to repeat trial and error in order to provide the tread 12 and the sidewall 14 smoothly and continuously.

Figure 5:
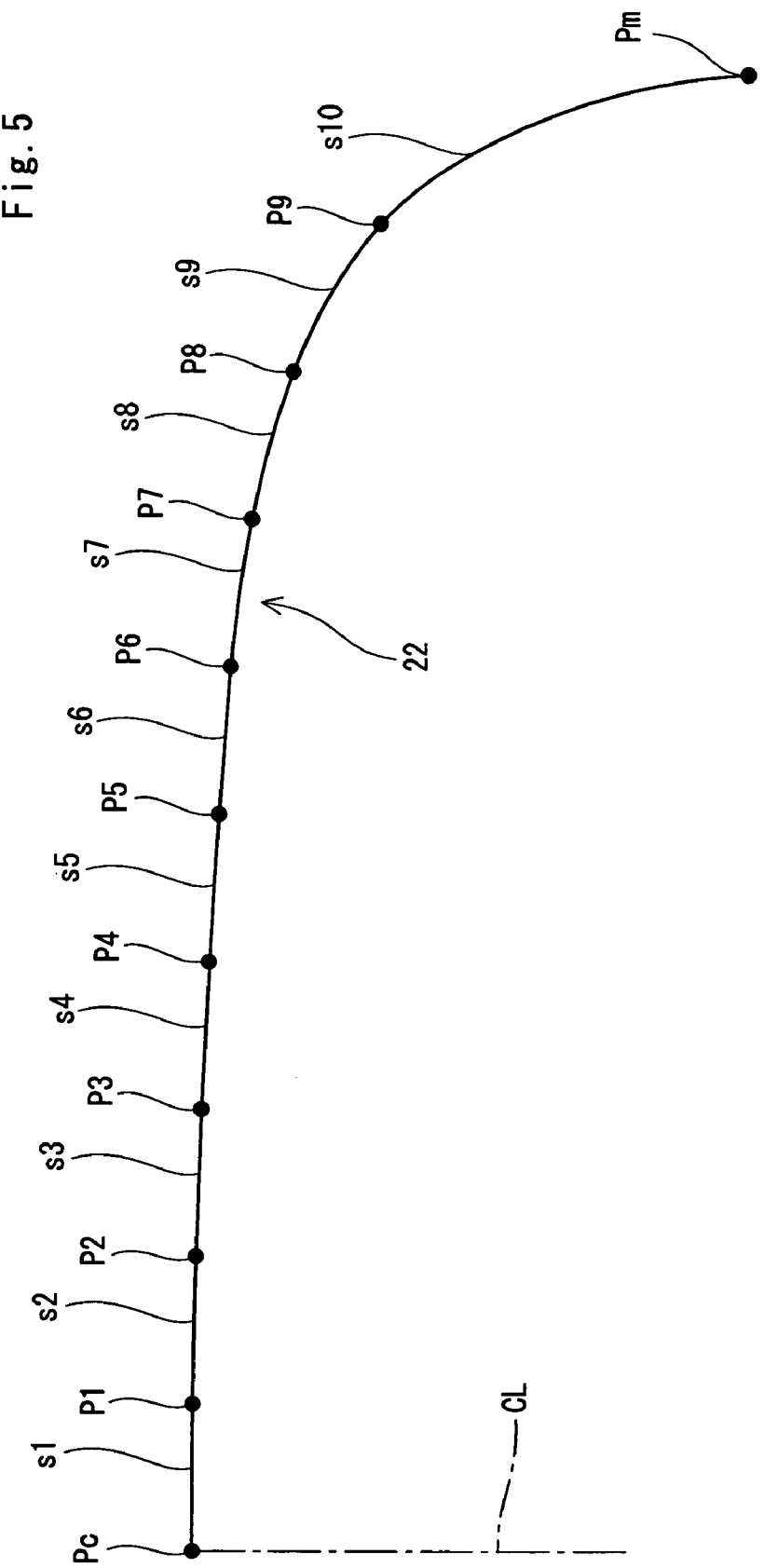
FIG. 5 is a typical view showing segments obtained by dividing a profile curve acquired by the design method of FIG. 4.

As shown in FIG. 5, next, the profile curve 22 is divided into a large number of segments (STEP 7). The number of the divisions is 3 to 20. In the example of FIG. 5, the profile curve 22 is divided into s1 to s10 by points P1 to P9. In this example, the number of the divisions is 10.

Figure 6:
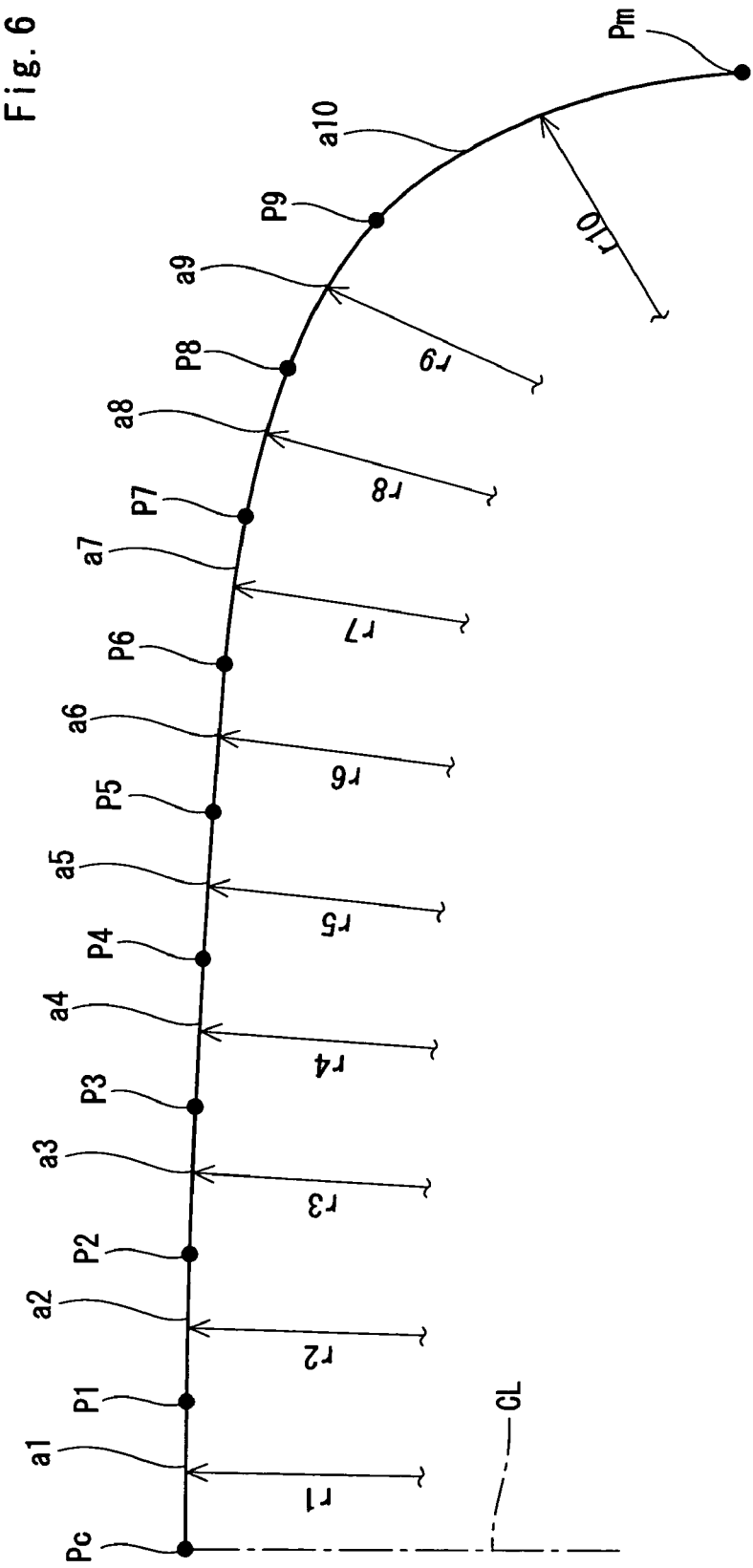
FIG. 6 is a typical view showing circular arcs to which the segments of FIG. 5 approximate.

As shown in FIG. 6, subsequently, each segment is caused to approximate to a circular arc (STEP 8). FIG. 6 shows 10 circular arcs indicated as a1 to a10. In the approximation, first of all, the first segment s1 is replaced with the circular arc a1 of a radius of curvature r1. The tire 11 is symmetrical and the circular arc a1 is tangent to a circular arc (not shown) on a left side from a center line CL of the tire 11. Therefore, the center of the radius of curvature r1 is to be positioned on the center line CL. The radius of curvature r1 of the circular arc a1 is determined in such a manner that the arc a1 passes through the positions Pc and P1 and the arc a1 has a center thereof which is positioned on the center line CL.

At the second circular arc a2, a radius of curvature r2 is determined in such a manner that the arc a2 passes through the points P1 and P2 and the arc a2 is tangent to the first circular arc a1. At the third circular arc a3, a radius of curvature r3 is determined in such a manner that the arc a3 passes through the points P2 and P3 and the arc a3 is tangent to the second circular arc a2. In the same manner, radii of curvature (r4 to r10) from the fourth circular arc a4 to the tenth circular arc a10 are determined. The tenth circular arc a10 is placed in a first position from the maximum width position Pm and the ninth circular arc a9 is placed in a second position from the maximum width position Pm.

All of the segments (s1 to s10) are caused to approximate to the circular arcs (a1 to a10), any of them which are provided adjacently being to each other. Consequently, it is possible to carry out a processing of a mold for tire with high precision by means of an NC machine.

At the maximum width position Pm, the circular arc a10 is adjacent to a contour line which is on an inside portion in a radial direction from the position Pm. In some cases, the radii of curvature are sequentially determined from the first circular arc a1 to the tenth circular arc a10 so that the circular arc a10 is not tangent to the contour line in the inside portion. In the case in which the circular arc a10 is not tangent to the contour line in the inside portion, an edge is generated in the maximum width position Pm. A stress concentrates on the edge. For this reason, the edge deteriorates the performance of the tire 11. In order to avoid the generation of the edge, the circular arcs a10 and a 9 are corrected (STEP 9).

Figure 7:
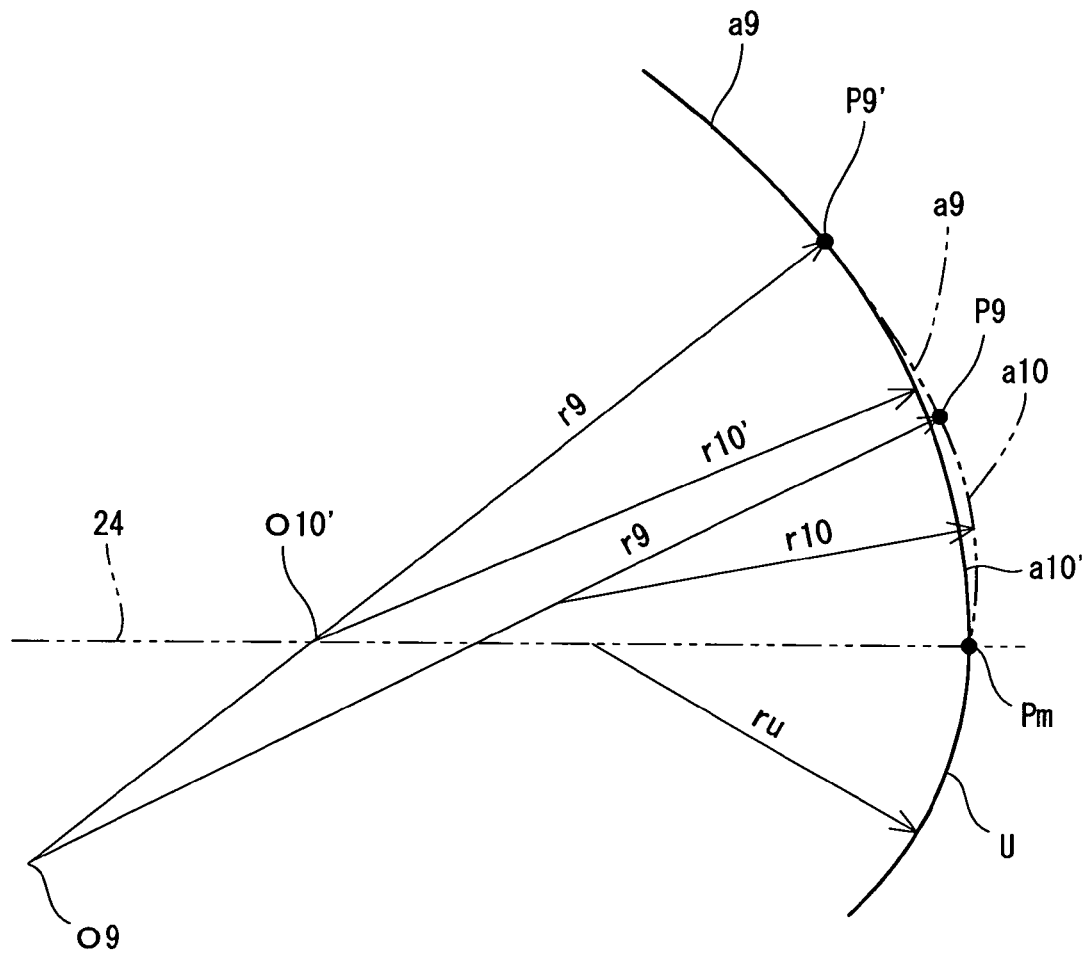
FIG. 7 is an enlarged view showing the state of the correction of the circular arc in FIG. 6.

FIG. 7 shows a correcting method. In this example, the center of a radius of curvature ru of a contour line U in the inside portion is present on a horizontal line 24 passing through the maximum width position Pm. In the correction, the boundary point P9 between the circular arc a10 and a9 is moved along a circumference defining the circular arc a9. In FIG. 7, a point obtained after the movement is indicated as P9'. The position of the point P9' is determined in such a manner that a circular arc which is tangent to the circular arc a9 on the point P9' is tangent to the contour line U on the point Pm. In this example, the position of the point P9' is determined in such a manner that a circular arc a10' setting, as a center, an intersecting point O10' of a straight line connecting the point P9' and a center O9 of a radius of curvature r9 and the horizontal line 24 passes through the point Pm. Consequently, it is possible to obtain a smooth and continuous curve which reaches the contour line U through the tread end Pe and the maximum width position Pm from the central position Pc in the lateral direction. Thus, the profile of the tire 11 is designed. The profile is displayed on the display portion 8. Each of the steps from the division (STEP 7) to the correction (STEP 9) is executed by the calculating portion 4.

Based on the profile thus obtained, the contact shape of the tire 11 is calculated by a simulation (STEP 10). The calculating method has been disclosed in Japanese Laid-Open Patent Publication No. 2000-296706. The designer decides the quality of the contact shape thus obtained (STEP 11). If the contact shape is not excellent, each of the steps from the input of the value of (b/a) (STEP 4) to the calculation of the contact shape (STEP 10) is executed again. If the contact shape is excellent, the profile thus designed is stored in the storage portion 6 (STEP 12).

It is also possible to use an ellipse having a major axis direction which is coincident with an X direction and a minor axis direction which is coincident with a Y-axis direction.

As described above, it is possible to easily obtain an excellent profile by the design method according to the present invention. The design method contributes to an enhancement in the efficiency of the development of a tire.

The above description is only illustrative and various changes can be made without departing from the scope of the present invention.

What is claimed is:

1. A method for designing a tire profile, comprising the steps of:
   inputting tire size data;
   determining a ratio (b/a) of a second axis radius "b" to a first axis radius "a" in an ellipse in which one of ends of a first axis is placed on a tire equator plane and a direction of the first axis is coincident with an axial direction of a tire;
   determining a constant of an involute function based on the tire size data in such a manner that an involute curve based on the ellipse having the ratio of (b/a) passes through a maximum width position of the tire and a central position in a lateral direction; and
   determining a profile curve reaching the maximum width position from the central position in the lateral direction based on the involute function having the constant; wherein
   the involute function is expressed in the following equations (I) and (II):

$$x(\theta) = a(1 + \cos\theta) + b\sin\theta\sqrt{1/(a^2\cos^2\theta + b^2\sin^2\theta)}\left[S - \int_{\pi}^{\pi-\theta}(a^2\cos^2\theta + b^2\sin^2\theta)d\theta\right] \quad (I)$$

and $$y(\theta) = b\sin\theta + a\cos\theta\sqrt{1/(a^2\cos^2\theta + b^2\sin^2\theta)}\left[S - \int_{\pi}^{\pi-\theta}(a^2\cos^2\theta + b^2\sin^2\theta)d\theta\right] \quad (II)$$

(In the Equations (I) and (II), "a" represents the first axis radius of the ellipse, "b" represents the second axis radius of the ellipse and "S" represents a length of a thread wound upon the ellipse. θ is π/2 to π).

2. The designing method according to claim 1, further comprising the steps of:
   dividing the profile curve into a plurality of segments; and
   causing the segments to approximate to circular arcs in such a manner that the adjacent circular arcs are tangent to each other.

3. The designing method according to claim 2, further comprising the step of moving a boundary point between a first circular arc from the maximum width position and a second circular arc along a circumference defining the second circular arc and correcting a radius of curvature of the first circular arc in such a manner that the first circular arc is tangent a contour line which is on an inside in a radial direction of a tire from the maximum width position at the maximum width position.

4. A tire profile design system comprising:
   input means for inputting a ratio (b/a) of a second axis radius "b" to a first axis radius "a" in an ellipse in which one of ends of a first axis is placed on a tire equator plane and a direction of the first axis is coincident with an axial direction of a tire and tire size data; and
   calculating means for determining a constant of an involute function based on the tire size data in such a manner that an involute curve based on the ellipse having the ratio (b/a) passes through a maximum width position of the tire and a central position in a lateral direction and determining a profile curve reaching the maximum width position from the central position in the lateral direction based on the involute function having the constant; wherein
   the involute function is expressed in the following equations (I) and (II):

$$x(\theta) = a(1 + \cos\theta) + b\sin\theta\sqrt{1/(a^2\cos^2\theta + b^2\sin^2\theta)}\left[S - \int_{\pi}^{\pi-\theta}(a^2\cos^2\theta + b^2\sin^2\theta)d\theta\right] \quad (I)$$

and $$y(\theta) = b\sin\theta + a\cos\theta\sqrt{1/(a^2\cos^2\theta + b^2\sin^2\theta)}\left[S - \int_{\pi}^{\pi-\theta}(a^2\cos^2\theta + b^2\sin^2\theta)d\theta\right] \quad (II)$$

(In the Equations (I) and (II), "a" represents the first axis radius of the ellipse, "b" represents the second axis radius of the ellipse and "S" represents a length of a thread wound upon the ellipse. θ is π/2 to π).

5. A computer program, carried on a computer-readable medium, for designing a tire profile, the program, when executed, carrying out the steps of:
   inputting tire size data;
   determining a ratio (b/a) of a second axis radius "b" to a first axis radius "a" in an ellipse in which one of ends of a first axis is placed on a tire equator plane and a direction of the first axis is coincident with an axial direction of a tire;
   determining a constant of an involute function based on the tire size data in such a manner that an involute curve based on the ellipse having the ratio (b/a) passes through a maximum width position of the tire and a central position in a lateral direction; and
   determining a profile curve reaching the maximum width position from the central position in the lateral direction based on the involute function having the constant; wherein
   the involute function is expressed in the following equations (I) and (II):

$$x(\theta) = a(1 + \cos\theta) + b\sin\theta\sqrt{1/(a^2\cos^2\theta + b^2\sin^2\theta)}\left[S - \int_{\pi}^{\pi-\theta}(a^2\cos^2\theta + b^2\sin^2\theta)d\theta\right] \quad (I)$$

and $$y(\theta) = b\sin\theta + a\cos\theta\sqrt{1/(a^2\cos^2\theta + b^2\sin^2\theta)}\left[S - \int_{\pi}^{\pi-\theta}(a^2\cos^2\theta + b^2\sin^2\theta)d\theta\right] \quad (II)$$

(In the Equations (I) and (II), "a" represents the first axis radius of the ellipse, "b" represents the second axis radius of the ellipse and "S" represents a length of a thread wound upon the ellipse. θ is π/2 to π).

* * * * *